United States Patent
Thangarajan

(10) Patent No.: US 12,511,596 B2
(45) Date of Patent: Dec. 30, 2025

(54) SYSTEMS AND METHODS RELATED TO MODELING AND PREDICTING AGENT FATIGUE IN A CONTACT CENTER

(71) Applicant: GENESYS CLOUD SERVICES, INC., Menlo Park, CA (US)

(72) Inventor: Parthiban Thangarajan, Chennai (IN)

(*) Notice: Subject to any disclaimer, the term of this patent is extended or adjusted under 35 U.S.C. 154(b) by 110 days.

(21) Appl. No.: 18/398,578

(22) Filed: Dec. 28, 2023

(65) Prior Publication Data
US 2025/0217733 A1    Jul. 3, 2025

(51) Int. Cl.
| | | |
|---|---|---|
| G06Q 10/0631 | (2023.01) | |
| G06F 11/34 | (2006.01) | |
| G06Q 10/0639 | (2023.01) | |

(52) U.S. Cl.
CPC .. G06Q 10/063114 (2013.01); G06F 11/3438 (2013.01); G06Q 10/06398 (2013.01)

(58) Field of Classification Search
CPC ......... G06Q 10/063; G06Q 10/063114; G06Q 10/06398; G06Q 10/0639; G06F 11/3438
See application file for complete search history.

(56) References Cited

U.S. PATENT DOCUMENTS

| | | | | |
|---|---|---|---|---|
| 11,694,479 B1 * | 7/2023 | Spinelli | ................. | G06V 40/20 |
| | | | | 382/103 |
| 2017/0357846 A1 * | 12/2017 | Dey | ....................... | G06V 40/20 |
| 2018/0346256 A1 * | 12/2018 | Kurihara | ................. | B25J 9/1674 |
| 2020/0253541 A1 * | 8/2020 | Okada | .................... | A61B 5/1116 |
| 2023/0058560 A1 * | 2/2023 | Biswas | .................... | G10L 25/06 |
| 2024/0161029 A1 * | 5/2024 | Kanagarajan | .......... | G06V 20/52 |
| 2024/0161046 A1 * | 5/2024 | Thakur | ............ | G06Q 10/06398 |

OTHER PUBLICATIONS

Li, Kai, Shuling Xu, and Hong Fu. "Work-break scheduling with real-time fatigue effect and recovery." International Journal of Production Research 58.3 (2020): 689-702. (Year: 2020).*

* cited by examiner

Primary Examiner — William S Brockington, III

(57) ABSTRACT

A method for tracking a level of fatigue among contact center agents for generating corrective actions. The method includes: generating, via an automated modeling process, a baseline model for an agent that models a non-fatigued pace of work for the agent; generating, via an automated fatigue scoring process, fatigue scores for the agent in relation to successively occurring respective subperiods occurring within a current shift; and monitoring, via a fatigue monitoring process, the fatigue scores of the agent generated during the current shift for triggering an automated action. The automated modeling process may include identifying intervals within respective shifts of the agent for representing non-fatigued pace of work data for the agent; and creating a training dataset from measurements taken during each of the identified intervals via a monitoring script values associated with a plurality of work pace parameters.

14 Claims, 6 Drawing Sheets

SYSTEMS AND METHODS RELATED TO MODELING AND PREDICTING AGENT FATIGUE IN A CONTACT CENTER

BACKGROUND

The present invention generally relates to customer relations services and customer relations management via contact centers and associated cloud-based systems. More particularly, but not by way of limitation, the present invention pertains to an automated tool for modeling and predicting agent fatigue so that preventive measures can be taken toward improving contact center performance.

BRIEF DESCRIPTION OF THE INVENTION

The present invention includes a method for tracking a level of fatigue among contact center agents for automatically generating corrective actions. The method may include the steps of: generating, via an automated modeling process, a baseline model for an agent that models a non-fatigued pace of work for the agent; generating, via an automated fatigue scoring process, fatigue scores in real time for the agent in relation to successively occurring respective subperiods occurring within a current shift; and monitoring, via a fatigue monitoring process, the fatigue scores of the agent generated during the current shift for triggering an automated action. The automated modeling process may include the steps of: identifying intervals within respective shifts of the agent for representing non-fatigued pace of work data for the agent; measuring, during each of the identified intervals via a monitoring script operating on a workstation of the agent, values associated with a plurality of work pace parameters; creating a training dataset that includes the measured values for the plurality of work pace parameters for each of the intervals; using the training dataset to train the baseline model for the agent via a machine learning algorithm, wherein the pace of work baseline model includes a neural network that is trained to: model the non-fatigued pace of work for the agent; and output a degree of deviation between the non-fatigued pace of work for the agent and an input of a current dataset representing a current pace of work. The automated fatigue scoring process, when described in relation to fatigue scoring for a first subperiod of the successive subperiods, may include the steps of: measuring, during the first subperiod via the monitoring script, values associated with a plurality of work pace parameters; creating a current dataset that includes the measured values for the plurality of work pace parameters for the first subperiod; providing, as input to the baseline model, the current dataset and generating as an output a degree of deviation between the non-fatigued pace of work of the baseline model and a current pace of work represented in the current dataset; and generating a fatigue score for the agent for the first subperiod based on the degree of deviation. The automated fatigue scoring process may include the steps of: comparing one or more of the fatigue scores of the current shift to one or more fatigue thresholds; and based on whether the one or more fatigue scores exceed the one or more fatigue thresholds, selectively triggering an automated action.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components, wherein.

DETAILED DESCRIPTION

Figure 1:
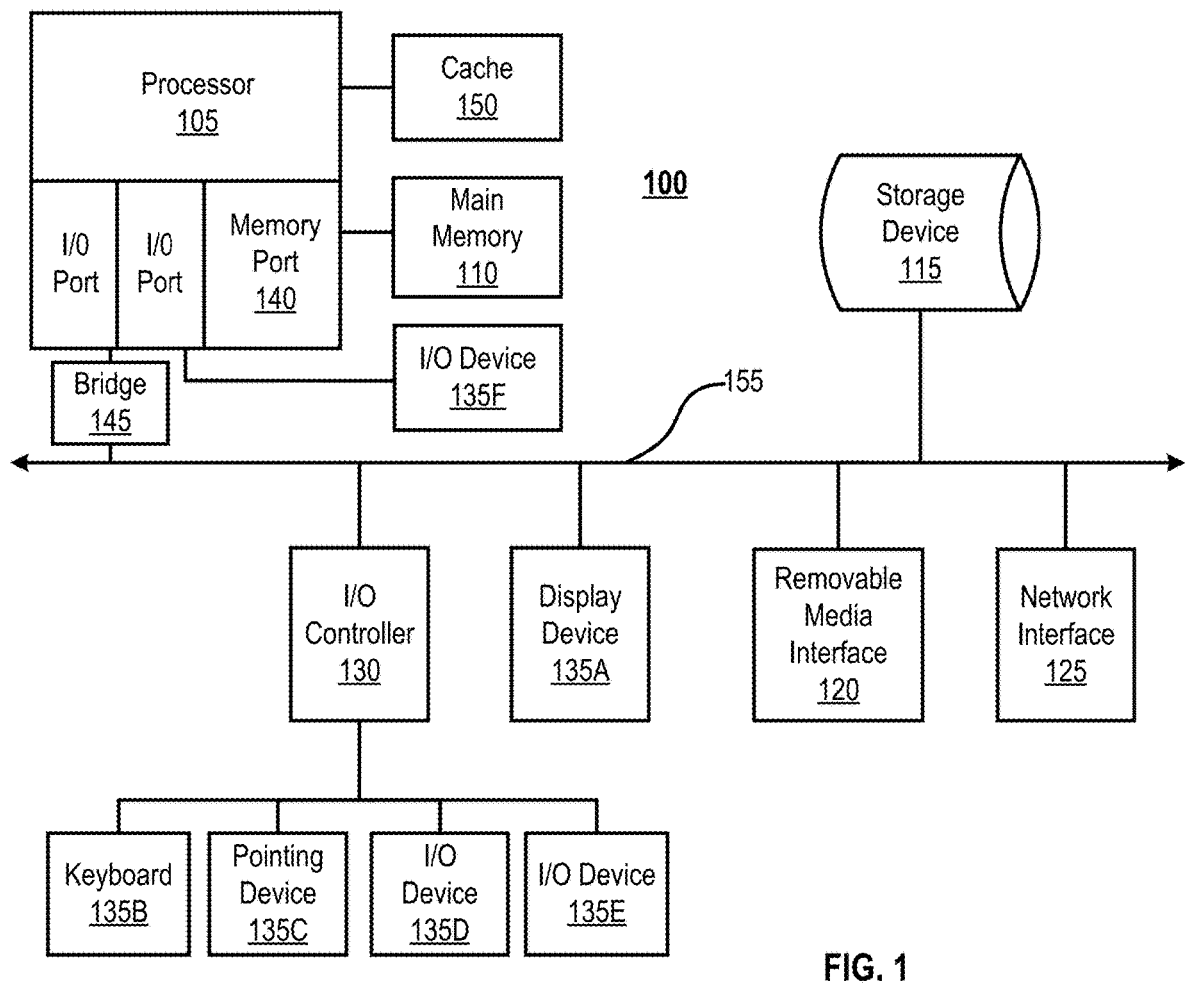
FIG. 1 depicts a schematic block diagram of a computing device in accordance with exemplary embodiments of the present invention and/or with which exemplary embodiments of the present invention may be enabled or practiced.

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. Additionally, further modification in the provided examples or application of the principles of the invention, as presented herein, are contemplated as would normally occur to those skilled in the art. Particular features, structures or characteristics may be combined in any suitable combinations and/or sub-combinations in one or more embodiments or examples. Those skilled in the art will recognize that various embodiments may be computer implemented using many different types of data processing equipment, with embodiments being implemented as an apparatus, method, or computer program product. Example embodiments, thus, may take the form of a hardware embodiment, a software embodiment, or combination thereof.

Computing Device

The present invention may be computer implemented using different forms of data processing equipment, for example, digital microprocessors and associated memory, executing appropriate software programs. By way of background, FIG. 1 illustrates a schematic block diagram of an exemplary computing device 100 in accordance with embodiments of the present invention and/or with which those embodiments may be enabled or practiced.

The computing device 100, for example, may be implemented via firmware (e.g., an application-specific integrated circuit), hardware, or a combination of software, firmware, and hardware. Each of the servers, controllers, switches, gateways, engines, and/or modules in the following figures (which collectively may be referred to as servers or modules) may be implemented via one or more of the computing devices 100. As an example, the various servers may be a process running on one or more processors of one or more computing devices 100, which may be executing computer program instructions and interacting with other systems or modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described in the following figures—such as, for example, the contact center 200 of FIG. 2—the various servers and computer devices thereof may be located on local computing devices 100 (i.e., on-site or at the same physical location as contact center agents), remote computing devices 100 (i.e., off-site or in a cloud computing environment, for example, in a remote data center connected to the contact center via a network), or some combination thereof. Functionality provided by servers located on off-site computing devices may be accessed and provided over a virtual private network (VPN), as if such servers were on-site, or the functionality may be provided using a software as a service (SaaS) accessed over the Internet using various protocols, such as by exchanging data via extensible markup language (XML), JSON, and the like.

As shown in the illustrated example, the computing device 100 may include a central processing unit (CPU) or processor 105 and a main memory 110. The computing device 100 may also include a storage device 115, removable media interface 120, network interface 125, I/O controller 130, and one or more input/output (I/O) devices 135, which as depicted may include an, display device 135A, keyboard 135B, and pointing device 135C. The computing device 100 further may include additional elements, such as a memory port 140, a bridge 145, I/O ports, one or more additional input/output devices 135D, 135E, 135F, and a cache memory 150 in communication with the processor 105.

The processor 105 may be any logic circuitry that responds to and processes instructions fetched from the main memory 110. For example, the processor 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The main memory 110 may be one or more memory chips capable of storing data and allowing stored data to be accessed by the central processing unit 105. The storage device 115 may provide storage for an operating system, which controls scheduling tasks and access to system resources, and other software. Unless otherwise limited, the computing device 100 may include an operating system and software capable of performing the functionality described herein.

As depicted in the illustrated example, the computing device 100 may include a wide variety of I/O devices 135, one or more of which may be connected via the I/O controller 130. Input devices, for example, may include a keyboard 135B and a pointing device 135C, e.g., a mouse or optical pen. Output devices, for example, may include video display devices, speakers, and printers. More generally, the I/O devices 135 may include any conventional devices for performing the functionality described herein.

Unless otherwise limited, the computing device 100 may be any workstation, desktop computer, laptop or notebook computer, server machine, virtualized machine, mobile or smart phone, portable telecommunication device, media playing device, or any other type of computing, telecommunications or media device, without limitation, capable of performing the operations and functionality described herein. The computing device 100 may include a plurality of such devices connected by a network or connected to other systems and resources via a network. Unless otherwise limited, the computing device 100 may communicate with other computing devices 100 via any type of network using any conventional communication protocol.

Contact Center

Figure 2:
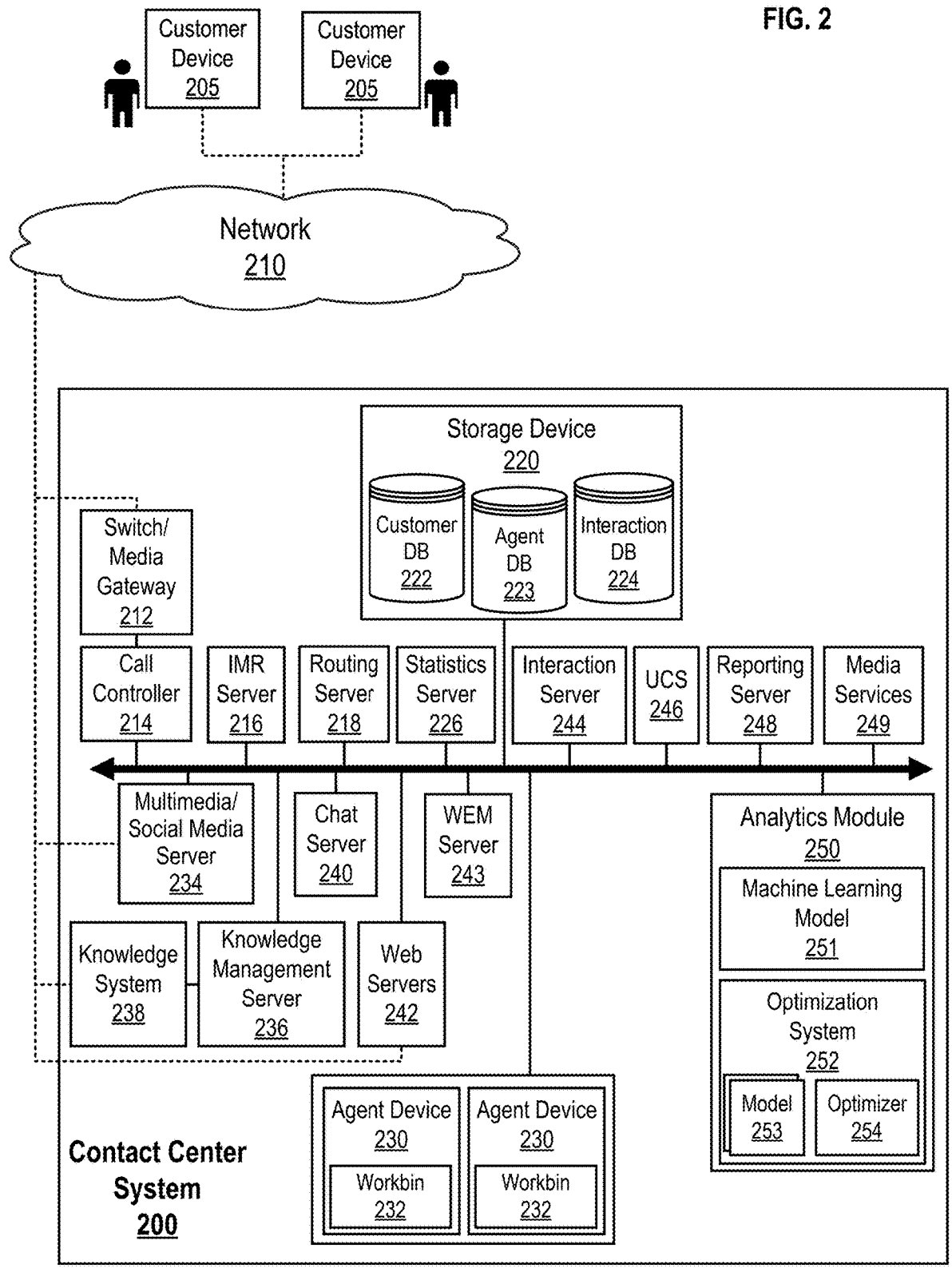
FIG. 2 depicts a schematic block diagram of a communications infrastructure or contact center in accordance with exemplary embodiments of the present invention and/or with which exemplary embodiments of the present invention may be enabled or practiced.

With reference now to FIG. 2, a communications infrastructure or contact center system (or simply "contact center") 200 is shown in accordance with exemplary embodiments of the present invention and/or with which exemplary embodiments of the present invention may be enabled or practiced. By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may assist customers in making purchasing decisions, receiving orders, or solving problems with products or services already received. Within a contact center, such interactions between agents and customers may be conducted over a variety of communication channels, such as, for example, via voice (e.g., telephone calls or voice over IP or VoIP calls), video (e.g., video conferencing), text (e.g., emails and text chat), screen sharing, co-browsing, or the like.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize automated processes in place of live agents, such as interactive voice response (IVR) systems, interactive media response (IMR) systems, internet robots or "bots", automated chat modules or "chatbots", and the like.

Referring specifically to FIG. 2, the contact center 200 may be used by a customer service provider to provide various types of services to customers. For example, the contact center 200 may be used to engage and manage interactions in which automated processes (or bots) or human agents communicate with customers. The contact center 200 may be an in-house facility of a business or enterprise for performing the functions of sales and customer service relative to products and services available through the enterprise. In another aspect, the contact center 200 may be operated by a service provider that contracts to provide customer relation services to a business or organization. Further, the contact center 200 may be deployed on equipment dedicated to the enterprise or third-party service provider, and/or deployed in a remote computing environment such as, for example, a private or public cloud environment with infrastructure for supporting multiple contact centers for multiple enterprises. The contact center 200 may include software applications or programs, which may be executed on premises or remotely or some combination thereof. It should further be appreciated that the various components of the contact center 200 may be distributed across various geographic locations.

Unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

In accordance with the illustrated example of FIG. 2, the components or modules of the contact center 200 may include: a plurality of customer devices 205; communications network (or simply "network") 210; switch/media gateway 212; call controller 214; interactive media response (IMR) server 216; routing server 218; storage device 220; statistics server 226; plurality of agent devices 230 that each have a workbin 232; multimedia/social media server 234; knowledge management server 236 coupled to a knowledge system 238; chat server 240; web servers 242; interaction server 244; universal contact server (or "UCS") 246; reporting server 248; media services server 249; and an analytics module 250. It should be understood that any of the computer-implemented components, modules, or servers described in relation to FIG. 2 or in any of the following figures may be implemented via computing devices, such as the computing device 100 of FIG. 1. As will be seen, the contact center 200 generally manages resources (e.g., personnel, computers, telecommunication equipment, etc.) to enable the delivery of services via telephone, email, chat, or other communication mechanisms. The various components, modules, and/or servers of FIG. 2 (and other figures included herein) each may include one or more processors executing computer program instructions and interacting with other system components for performing the various functionalities described herein. Further, the terms "interaction" and "communication" are used interchangeably, and generally refer to any real-time and non-real-time interaction that uses any communication channel including, without limitation, telephone calls (PSTN or VOIP calls), emails, voicemails, video, chat, screen-sharing, text messages, social media messages, WebRTC calls, etc. Access to and control of the components of the contact system 200 may be affected through user interfaces (UIs) which may be generated on the customer devices 205 and/or the agent devices 230.

Customers desiring to receive services from the contact center 200 may initiate inbound communications (e.g., telephone calls, emails, chats, etc.) to the contact center 200 via a customer device 205. While FIG. 2 shows two such customer devices it should be understood that any number may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center 200, such as telephone calls, emails, chats, text messages, web-browsing sessions, and other multi-media transactions. Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include a wireless carrier network including a code division multiple access network, global system for mobile communications (GSM) network, or any wireless network/technology conventional in the art.

The switch/media gateway 212 may be coupled to the network 210 for receiving and transmitting telephone calls between customers and the contact center 200. The switch/media gateway 212 may include a telephone or communication switch configured to function as a central switch for agent routing within the center. The switch may be a hardware switching system or implemented via software. For example, the switch 215 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. In general, the switch/media gateway 212 establishes a voice connection between the customer and the agent by establishing a connection between the customer device 205 and agent device 230. The switch/media gateway 212 may be coupled to the call controller 214 which, for example, serves as an adapter or interface between the switch and the other routing, monitoring, and communication-handling components of the contact center 200. The call controller 214 may be configured to process PSTN calls, VoIP calls, etc. The call controller 214 may include computer-telephone integration (CTI) software for interfacing with the switch/media gateway and other components. The call controller 214 may extract data about an incoming interaction, such as the customer's telephone number, IP address, or email address, and then communicate these with other contact center components in processing the interaction.

The interactive media response (IMR) server 216 enables self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. Through continued interaction with the IMR server 216, customers may receive service without needing to speak with an agent. The IMR server 216 may ascertain why a customer is contacting the contact center so to route the communication to the appropriate resource.

The routing server 218 routes incoming interactions. For example, once it is determined that an inbound communication should be handled by a human agent, functionality within the routing server 218 may select the most appropriate agent and route the communication thereto. This type of functionality may be referred to as predictive routing. Such agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230, which may enhance the service the agent is able to provide.

Regarding data storage, the contact center 200 may include one or more mass storage devices—represented generally by the storage device 220—for storing data in one or more databases. For example, the storage device 220 may store customer data that is maintained in a customer database 222. Such customer data may include customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center 200 may include agent availability and agent profiles, schedules, skills, average handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center 200 in ways that facilitate the functionality described herein. For example, the servers or modules of the contact center 200 may query such databases to retrieve data stored therewithin or transmit data thereto for storage.

The statistics server 226 may be configured to record and aggregate data relating to the performance and operational aspects of the contact center 200. Such information may be compiled by the statistics server 226 and made available to other servers and modules, such as the reporting server 248, which then may produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 230 of the contact center 200 may be communication devices configured to interact with the various components and modules of the contact center 200 to facilitate the functionality described herein. An agent device 230, for example, may include a telephone adapted for regular telephone calls or VoIP calls. An agent device 230 may further include a computing device configured to communicate with the servers of the contact center 200, perform data processing associated with operations, and interface with customers via voice, chat, email, and other multimedia communication mechanisms according to functionality described herein. While only two such agent devices are shown, any number may be present.

The multimedia/social media server 234 may be configured to facilitate media interactions (other than voice) with the customer devices 205 and/or the servers 242. Such media interactions may be related, for example, to email, voicemail, chat, video, text-messaging, web, social media, co-browsing, etc. The multi-media/social media server 234 may take the form of any IP router conventional in the art with specialized hardware and software for receiving, processing, and forwarding multi-media events and communications.

The knowledge management server 234 may be configured to facilitate interactions between customers and the knowledge system 238. In general, the knowledge system 238 may be a computer system capable of receiving questions or queries and providing answers in response. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art.

The chat server 240 may be configured to conduct, orchestrate, and manage electronic chat communications with customers. Such chat communications may be conducted by the chat server 240 in such a way that a customer communicates with automated chatbots, human agents, or both. The chat server 240 may perform as a chat orchestration server that dispatches chat conversations among chatbots and available human agents. In such cases, the processing logic of the chat server 240 may be rules driven so to leverage an intelligent workload distribution among available chat resources. The chat server 240 further may implement, manage and facilitate user interfaces (also UIs) associated with the chat feature. The chat server 240 may be configured to transfer chats within a single chat session with a particular customer between automated and human sources. The chat server 240 may be coupled to the knowledge management server 234 and the knowledge systems 238 for receiving suggestions and answers to queries posed by customers during a chat so that, for example, links to relevant articles can be provided.

The web servers 242 provide site hosts for a variety of social interaction sites to which customers subscribe, such as Facebook, Twitter, Instagram, etc. Though depicted as part of the contact center 200, it should be understood that the web servers 242 may be provided by third parties and/or maintained remotely. The web servers 242 may also provide webpages for the enterprise or organization being supported by the contact center 200. For example, customers may browse the webpages and receive information about the products and services of a particular enterprise. Within such enterprise webpages, mechanisms may be provided for initiating an interaction with the contact center 200, for example, via web chat, voice, or email. An example of such a mechanism is a widget, which can be deployed on the webpages or websites hosted on the web servers 242. As used herein, a widget refers to a user interface component that performs a particular function. In some implementations, a widget includes a GUI that is overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Such widgets may include additional user interfaces and be configured to access a variety of local resources (e.g., a calendar or contact information on the customer device) or remote resources via network (e.g., instant messaging, electronic mail, or social networking updates).

The interaction server 244 is configured to manage deferrable activities of the contact center and the routing thereof to human agents for completion. As used herein, deferrable activities include back-office work that can be performed off-line, e.g., responding to emails, attending training, and other activities that do not entail real-time communication with a customer.

The universal contact server (UCS) 246 may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer, such as data related to comments from agents, customer communication history, and the like. Each of these data types then may be stored in the customer database 222 or on other modules and retrieved as functionality described herein requires.

The reporting server 248 may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to a request and used toward managing the contact center in accordance with functionality described herein.

The media services server 249 provides audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, audio and video transcoding, secure real-time transport protocol (SRTP), audio or video conferencing, call analysis, keyword spotting, etc.

The analytics module 250 may be configured to perform analytics on data received from a plurality of different data sources as functionality described herein may require. The analytics module 250 may also generate, update, train, and modify predictors or models, such as machine learning model 251 and/or models 253, based on collected data. To achieve this, the analytics module 250 may have access to the data stored in the storage device 220, including the customer database 222 and agent database 223. The analytics module 250 also may have access to the interaction database 224, which stores data related to interactions and interaction content (e.g., audio and transcripts of the interactions and events detected therein), interaction metadata (e.g., customer identifier, agent identifier, medium of interaction, length of interaction, interaction start and end time, department, tagged categories), and the application setting (e.g., the interaction path through the contact center). The analytic module 250 may retrieve such data from the storage device 220 for developing and training algorithms and models. It should be understood that, while the analytics module 250 is depicted as being part of a contact center, the functionality described in relation thereto may also be implemented on customer systems (or, as also used herein, on the "customer-side" of the interaction) and used for the benefit of customers.

The machine learning model 251 may include one or more machine learning models, which may be based on neural networks. In certain embodiments, the machine learning model 251 is configured as a deep learning model, which is a type of machine learning based on neural networks in which multiple layers of processing are used to extract progressively higher level features from data. As an example, the machine learning model 251 may be configured to predict behavior. Such behavioral models may be trained to predict the behavior of customers and agents in a variety of situations so that interactions may be personally tailored to customers and handled more efficiently by agents. As another example, the machine learning model 251 may be configured to predict aspects related to contact center operation and performance. In other cases, for example, the machine learning model 251 also may be configured to perform natural language processing and, for example, provide intent recognition and the like.

The analytics module 250 may further include an optimization system 252. The optimization system 252 may include one or more models 253, which may include the machine learning model 251, and an optimizer 254. The optimizer 254 may be used in conjunction with the models 253 to minimize a cost function subject to a set of constraints, where the cost function is a mathematical representation of desired objectives or system operation. Because the models 253 are typically non-linear, the optimizer 254 may be a nonlinear programming optimizer. It is contemplated, however, that the optimizer 254 may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like. The analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, allocation of system resources, system analytics, or other functionality related to automated processes.

Machine Learning Models

Figure 3:
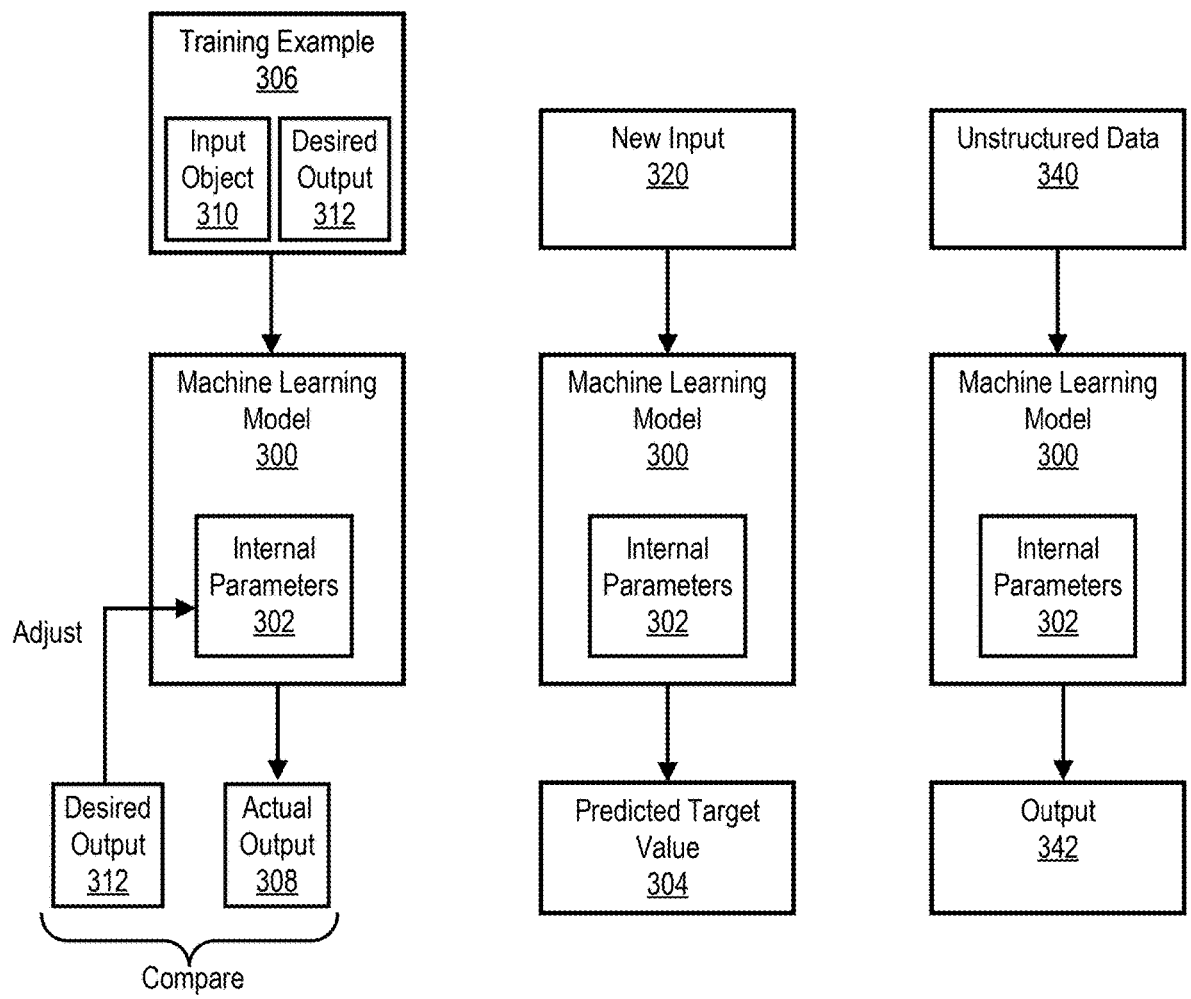
FIG. 3 is a simplified flow diagram demonstrating functionality of a machine learning model in accordance with embodiments of the present invention.

FIG. 3 illustrates an exemplary machine learning model 300, which may be included in one or more of the embodiments of the present invention. The machine learning model 300 may be a component, module, computer program, system, or algorithm. As described below, some embodiments herein use machine learning for providing predictive analytics for application in a contact center. Machine learning model 300 may be used as the model to power those embodiments. Machine learning model 300 is trained with training data samples 306, which may include an input object 310 and a desired output value 312. For example, the input object 310 and desired object value 312 may be tensors. A tensor is a matrix of n dimensions where n may be any of 0 (a constant), 1 (an array), 2 (a 2D matrix), 3, 4, or more.

The machine learning model 300 has internal parameters that determine its decision boundary and that determine the output that the machine learning model 300 produces. After each training iteration, which includes inputting the input object 310 of a training data sample into the machine learning model 300, the actual output 308 of the machine learning model 300 for the input object 310 is compared to the desired output value 312. One or more internal parameters 302 of the machine learning model 300 may be adjusted such that, upon running the machine learning model 300 with the new parameters, the produced output 308 will be closer to the desired output value 312. If the produced output 308 was already identical to the desired output value 312, then the internal parameters 302 of the machine learning model 300 may be adjusted to reinforce and strengthen those parameters that caused the correct output and reduce and weaken parameters that tended to move away from the correct output.

The machine learning model 300 output may be, for example, a numerical value in the case of regression or an identifier of a category in the case of classifier. A machine learning model trained to perform regression may be referred to as a regression model and a machine learning model trained to perform classification may be referred to as a classifier. The aspects of the input object that may be considered by the machine learning model 300 in making its decision may be referred to as features. After machine learning model 300 has been trained, a new, unseen input object 320 may be provided as input to the model 300. The machine learning model 300 then produces an output representing a predicted target value 304 for the new input object 320, based on its internal parameters 302 learned from training.

The machine learning model 300 may be, for example, a neural network, support vector machine (SVM), Bayesian network, logistic regression, logistic classification, decision tree, ensemble classifier, or other machine learning model. Machine learning model 300 may be supervised or unsupervised. In the unsupervised case, the machine learning model 300 may identify patterns in unstructured data 340 without training data samples 306. Unstructured data 340 is, for example, raw data upon which inference processes are desired to be performed. An unsupervised machine learning model may generate output 342 that includes data identifying structure or patterns.

The neural network may consist of a plurality of neural network nodes, where each node includes input values, a set of weights, and an activation function. The neural network node may calculate the activation function on the input values to produce an output value. The activation function may be a non-linear function computed on the weighted sum of the input values plus an optional constant. In some embodiments, the activation function is logistic, sigmoid, or a hyperbolic tangent function. Neural network nodes may be connected to each other such that the output of one node is the input of another node. Moreover, neural network nodes may be organized into layers, each layer including one or more nodes. An input layer may include the inputs to the neural network and an output layer may include the output of the neural network. A neural network may be trained and update its internal parameters, which include the weights of each neural network node, by using backpropagation.

In some embodiments, a convolutional neural network (CNN) may be used. A convolutional neural network is a type of neural network and machine learning model. A convolutional neural network may include one or more convolutional filters, also known as kernels, that operate on the outputs of the neural network layer that precede it and produce an output to be consumed by the neural network layer subsequent to it. A convolutional filter may have a window in which it operates. The window may be spatially local. A node of the preceding layer may be connected to a node in the current layer if the node of the preceding layer is within the window. If it is not within the window, then it is not connected. A convolutional neural network is one kind of locally connected neural network, which is a neural network where neural network nodes are connected to nodes of a preceding layer that are within a spatially local area. Moreover, a convolutional neural network is one kind of sparsely connected neural network, which is a neural network where most of the nodes of each hidden layer are connected to fewer than half of the nodes in the subsequent layer. In other embodiments, a recurrent neural network (RNN) may be used. A recurrent neural network is another type of neural network and machine learning model. A recurrent neural network includes at least one back loop, where the output of at least one neural network node is input into a neural network node of a prior layer. The recurrent neural network maintains state between iterations, such as in the form of a tensor. The state is updated at each iteration, and the state tensor is passed as input to the recurrent neural network at the new iteration. In still other embodiments, the recurrent neural network is a long short-term memory (LSTM) neural network. In some embodiments, the recurrent neural network is a bi-directional LSTM neural network. A feed forward neural network is another type of a neural network and has no back loops. In some embodiments, a feed forward neural network may be densely connected, meaning that most of the neural network nodes in each layer are connected to most of the neural network nodes in the subsequent layer. In some embodiments, the feed forward neural network is a fully-connected neural network, where each of the neural network nodes is connected to each neural network node in the subsequent layer. A gated graph sequence neural network (GGSNN) is a type of neural network that may be used in some embodiments. In a GGSNN, the input data is a graph, comprising nodes and edges between the nodes, and the neural network outputs a graph. The graph may be directed or undirected. A propagation step is performed to compute node representations for each node, where node representations may be based on features of the node. An output model maps from node representations and corresponding labels to an output for each node. The output model is defined per node and is a differentiable function that maps to an output. Further, embodiments may include neural networks of different types or the same type that are linked together into a sequential or parallel series of neural networks, where subsequent neural networks accept as input the output of one or more preceding neural networks. The combination of multiple neural networks may be trained from end-to-end using backpropagation from the last neural network through the first neural network. As stated, the machine learning model 251 may also be configured as a deep learning model. The deep learning model is type of machine learning based on neural networks in which multiple layers of processing are used to extract progressively higher level features from data. Deep learning models are generally more adept at unsupervised learning.

Figure 4:
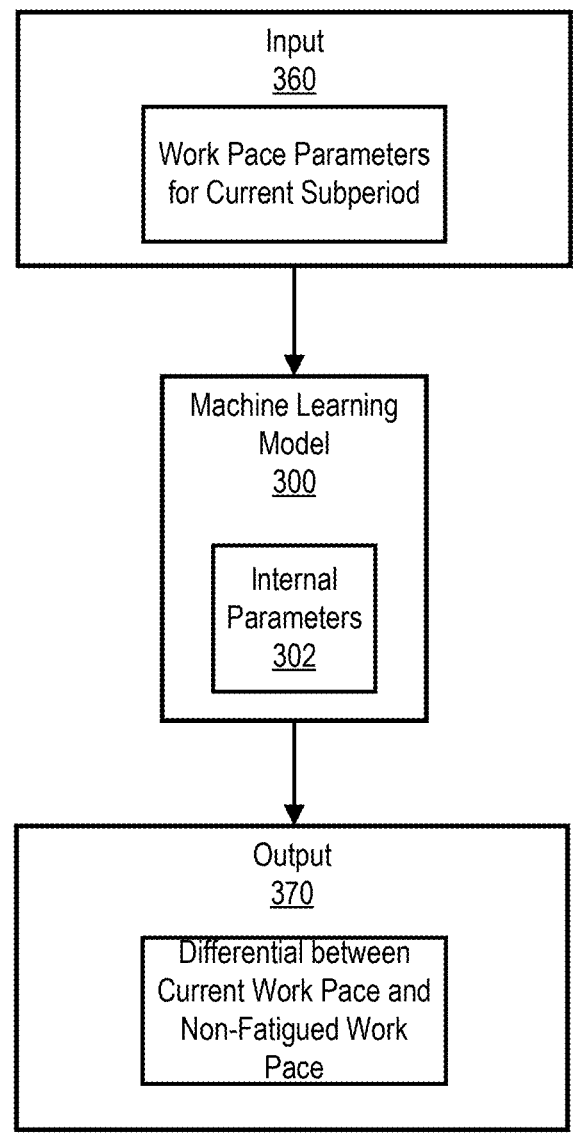
FIG. 4 is a schematic representation of a machine learning model in accordance with exemplary operation of embodiments of the present invention.

FIG. 4 illustrates use of the machine learning model 300 to perform inference on input 360. As described below, the input 302 may include work pace parameters collected in regard to an agent or group of agents. The machine learning model 300 then performs inference on the data based on its internal parameters 302 that are learned through training. The machine learning model 300 generates an output 370. In one embodiment, the output 370 may be a differential between non-fatigued work pace (as modeled by a trained baseline model) and the current work pace given the input. In exemplary embodiment, the machine learning model 300 may be configured according to desirability of particular machine learning algorithms for achieving the functionality described herein. As an example, the machine learning model 300 may include one or more neural networks. In a preferred embodiment, the model 300 is an autoencoder machine learning model, as discussed more below.

In other embodiments, for example, the machine learning model 300 may include a recurrent neural networks (RNNs), which are generally effective for processing sequential data, such as text, audio, or time series data. Such models are designed to remember or "store" information from previous inputs, which allows them to make use of context and dependencies between time steps. This makes them useful for tasks such as language translation, speech recognition, and time series forecasting. In some embodiments, the RNN may include long short-term memory (LSTM) networks or gated recurrent units (GRUs). Both LSTMs and GRUs are designed to address the problem of "vanishing gradients" in RNNs, which occurs when the gradients of the weights in the network become very small and the network has difficulty learning. LSTM networks are a type of RNN that use a special type of memory cell to store and output information. These memory cells are designed to remember information for long periods of time, and they do this by using a set of "gates" that control the flow of information into and out of the cell. The gates in an LSTM network are controlled by sigmoid activation functions, which output values between 0 and 1. The gates allow the network to selectively store or forget information, depending on the values of the inputs and the previous state of the cell. GRUs, on the other hand, are a simplified version of LSTMs that use a single "update gate" to control the flow of information into the memory cell, rather than the three gates used in LSTMs. This makes GRUs easier to train and faster to run than LSTMs, but they may not be as effective at storing and accessing long-term dependencies. In other embodiments, the machine learning model 520 may be configured as a sequence to sequence model comprising a first encoder model and a decoder model. The first encoder may include a RNN, or convolutional neural network (CNN), or another machine learning model capable of accepting sequence input. The decoder may include a RNN, CNN, or another machine learning model capable of generating sequence output. The sequence to sequence model may be trained on training data samples, wherein each training data sample includes a sequence of vector embeddings representing a sequence of customer journey events and a journey outcome. For example, the sequence to sequence model may be trained by inputting the input data to the first encoder model to create a first embedding vector. The first embedding vector may be input to the decoder model to create an output result of a predicted outcome. The output result may be compared to the actual outcome, and the parameters of the first encoder and the decoder may be adjusted to reduce the difference between the predicted outcome and the actual outcome. The parameters may be adjusted through back-propagation. In an embodiment, the sequence to sequence model may include a second encoder which takes in additional information related to the failed test/breaking change to create a second embedding vector. The first embedding vector may be combined with the second embedding vector as input to the decoder. For example, the first and second embedding vectors may be combined using concatenation, addition, multiplication, or another function. In another example, the features may include statistics computed on the count and order of words or characters in the data associated with particular event features, for example, words associated with a page-URL. In other embodiments, the machine learning model for outputting a predicted outcome may be an unsupervised model, such as a deep learning model. The unsupervised model is not trained and instead identifies its predictions based on identification of patterns in the data. In an embodiment, the unsupervised machine learning model may identify common features in the training dataset.

Modeling and Predicting Agent Fatigue

The manner in which agents conduct their job functions, including how they interact with customers, determine whether a contact center is successful in its mission to deliver services in a cost effective manner. Agent fatigue is a common problem that detrimentally impacts an agent's ability to perform at their highest level. When agents are fatigued, it is often impossible for contact centers to meet performance goals.

Yet agent fatigue is poorly understood. Supervisors are often left in the dark as when agents are fatigued, how such fatigue is impacting performance, and what type of actions can be taken—and when those actions should be taken—to alleviate the problem. This problem is exacerbated when contact centers operate at round-the-clock shifts. By nature, our physical body as well as brain functions at a relatively lower pace once fatigue sets in. Extreme tiredness or sleepiness results in an agent's performance suffering, often dramatically. This is particularly when gauging performance handling live conversations with customers where fast processing of information is needed to deliver the quick and effective results that today's customers expect as a matter of course. Additionally, fatigue often makes agents less patient or even irritable when dealing with customers in a live setting, which is completely unacceptable in an industry that evaluates agent performance largely in relation to customer satisfaction. Given this backdrop, it would be beneficial if the issue of agent fatigue was better understood. In this way, for example, fatigue issues could be identified early and corrective action taken to reduce any negative impact to the performance metrics of a contact center.

More specifically, a typical agent works many shifts a week, with each shift often including long stretches of work without a break. Further, the pace of work during a shift can be constant and unrelenting, with the agent automatically being routed tasks/interactions to handle from the moment they log onto their workstation, as the queue of customers waiting for a connection with an agent can be ever present. An agents work is also generally filled with repeated tasks. Such repetition can be a cause of fatigue among agents. Further, studies have shown repeatedly that a tired or fatigue agent is less effective in most every aspect of their job. For example, studies show fatigue severely affects an agent's ability to deliver a pleasant demeanor when dealing with customers, with agents more likely to show annoyance or be short with customers when they are low on energy. Customers dealing with fatigued agents often face dull voices, slow responses, and less empathetic reactions. The ability to detect, monitor, and predict agent fatigue would largely render many of these detrimental effects avoidable. For example, in accordance with exemplary embodiments, contact center supervisors would be able to take timely actions that yield better overall results for the contact center, including planning work hours for agents more appropriately, modify call distributions, provide extra breaks, as well as other measures described herein.

In exemplary embodiments, the present system proposes to monitor agent interactions with customer and related work to detect and model agent fatigue. This may be done on an individual basis for agents or on a group basis. The example that follows discusses how the present invention may be applied in relation to an individual agent. It should be understood, however, that the functionality may be extended to apply to a group of agents, either by modeling the agents as a group or by aggregating individual results and/or individual models. In regard to an individual agent, exemplary embodiments may include providing a monitoring script that operates in the background of the agent's workstation to collect what will be referred to herein as pace of work data. Pace of work data, as used herein, is data measured in relation to several specific parameters—which may be referred to as work pace parameters—that indicate the pace that an agent is working at. The work pace parameters may be measured as an agent interacts with customers and performs related job functions. In certain embodiments, this may include monitoring and collecting data on a list of specific work pace parameters, or subsets thereof, which are described below. Collectively, these work pace parameters have been found to effectively define a pace of work that an agent is achieving over a given work period. Further, an agent's performance in relation to these work pace parameters has been found to correlate strongly with agent fatigue. That is, the scores an agent achieves in relation to the work pace parameters typically vary significantly between when the agent is not experiencing fatigue and when the agent is experiencing fatigue.

In exemplary embodiments of the present invention, data on the work pace parameters may be collected repeatedly during predefined subperiods occurring sequentially within an agent's shift. For example, the subperiod may be defined as a 15 minute subperiod, 30 minute subperiod, an hour subperiod, or some other desired and sequentially repeatable length.

In exemplary embodiments of the present invention, the pace of work data may be collected during a most recently occurring subperiod (or "most recent subperiod") to define a current pace of work for the agent. The current pace of work for the agent then may be compared to a pace of work baseline model for the agent, which, as used herein, is a pace of work baseline model that reflects how the agent scores in regard to the work pace parameters when the agent is fresh, i.e., not fatigued.

As described in more detail below, the pace of work baseline model for the agent may be calculated via output data collected during one or more working periods or intervals when it is determined that the agent is not fatigued, or, at least, when it is determined that the agent is likely not fatigue, the likelihood of which may be based on either when the shift occurred (for example, toward the beginning of the shift) or performance metrics associated with work the agent did during a particular period within the shift. Accordingly, in certain embodiments, such working periods may be selected as those occurring at or near the beginning of a shift. In other embodiments, such working periods may be determined retroactively at the end of a given shift upon reviewing how the agent performed in relation to the work pace parameters over different intervals occurring within the shift. The pace of work baseline model may be updated as more data is collected on the agent. The pace of work baseline model may be a trained model, such as a machine learning model, that models the manner in which the agent works when not fatigued according to collected pace of work data.

The current work pace data may then be compared to the work of pace baseline model to calculate a fatigue score. In some embodiments, the current work pace data is provided as an input to the trained work of pace baseline model, which further trained to calculate a differential between current work pace data and the pace of work baseline for the agent. The extent of the calculated differential then becomes the basis for the fatigue score.

In exemplary embodiments of the present invention, the work pace parameters may include the following. A chat typing parameter may be included that is a work pace parameter measuring the speed and/or accuracy of the typing of an agent when engaged in a chat session. An email typing parameter may be included that is a work pace parameter measuring the speed and/or accuracy of the typing of an agent when engaged in emailing. A mouse movement parameter (which, more broadly, may referred to a site navigation parameter) may be included that is a work pace parameter measuring the rate at which the agent moves the mouse when engaged with various forms of work, which may include speed of movement and/or accuracy and/or length of pauses between movements and/or time to execute certain types of movements. In one embodiment, the mouse movement parameter may be a measures associated with the agent executing a predetermined type of mouse movement for completing a certain task. For example, this may include moving from one screen to another screen as required to complete different aspects of an interaction, like between functionality associated with the actual interaction and afterwork. More generally, as a site navigation parameter, this work pace parameter may focus more on how an agent navigates or moves between the programs/applications that are regularly used to interact with customers and/or perform after-interaction work and related functions, particular between those functions that are usually performed sequentially. A voice parameter may be included that is a work pace parameter measuring characteristics of the agents voice when conversing with customers, for example, this may include volume, tone, rate of speech, and length of pauses when speaking. A response time parameter may be included that is a work pace parameter measuring how long it takes the agent to respond to the pending chat or email from a customer once it has been routed to the agent for handling or once the agent has begun the assigned task. A response length parameter may be included that is a work pace parameter measuring the length (for example in number of words) of the content generated in responses provided by the agent to chat or emails. A breaks taken parameter may be included that is a work pace parameter measuring the number of breaks an agent takes during a given time period. This parameter may apply to actual breaks, such as bathroom breaks, coffee breaks, etc. where the agent is away from their desk, and may include the length of the breaks, reasons for taking (if available, and the timing of each break. The breaks taken parameter also may measure mini breaks occurring where the agent just loses their train of thought and has longer than momentary lapses (for example, nods off or otherwise rests, where no work is detected as being completed by the agent (i.e., no typing, phone calls, etc.) for a time period that exceeds some minimum. This may further include time when the agent is on their personal phone or a website for personal reasons.

In exemplary embodiments of the present invention, several contextual parameters may also be tracked to provide context to the work pace parameters. These parameters, which may be referred to as context parameters, may be tracked in relation to each subperiod/shift as well as in association with measurements recorded in relation to the work pace parameters. Context parameters may provide contextual data that is used to generate the pace of work baseline models, which provides additional nuance to the understanding provided by the model of the working patterns of agents. The time-of-day parameter may be included that is a context parameter recording and tracking the time of day associated with particular work events and measurements taken with shifts. For example, the time that an agent logs in for a shift is recorded as well as the worktime that has accumulated for an agent since the logged in. The time-of-day context parameter may further identify the time zone that the agent occupies. A shift type parameter may be included that is a context parameter identifying several attributes related to a shift that the agent is working, such as whether it is a morning, afternoon, or night shift, how long the shift is, and proximity to other shifts that the agent has worked or will work (e.g., how many shifts did the agent work in the preceding 48 hours and how many shift is the agent scheduled to work over the next 48 hours). A last break parameter may be included that is a context parameter measuring the time that has accumulated since the agent last had a break, such as a coffee break, lunch or dinner break, etc.

In exemplary embodiments of the present invention, a pace of work baseline model, or simply "model", may be developed for each agent or in relation to a group of agents. The model may be a machine learning model. In certain embodiments, the model is a deep learning model. More specifically, in accordance with exemplary embodiments, the model may be an autoencoder machine learning model (or simply "autoencoder"). As will be appreciated, an autoencoder is a type of artificial neural network used to learn efficient codings of unlabeled data (unsupervised learning). An autoencoder may learn two functions: an encoding function that transforms the input data, and a decoding function that recreates the input data from the encoded representation. The autoencoder learns an efficient representation (encoding) for a set of data, typically for dimensionality reduction. Variants exist, aiming to force the learned representations to assume useful properties. Examples are regularized autoencoders (sparse, denoising, and contractive), which are effective in learning representations for subsequent classification tasks, and variational autoencoders, with applications as generative models. Autoencoders can be applied to many problems, including facial recognition, feature detection, anomaly detection, acquiring the meaning of words, as autoencoders are effective at representation learning. For example, an autoencoder's encoder serves as a feature extractor with the extracted features then compressed into a vector representation in the code layer. The output of this layer in this instance can be taken as including the most salient features contained in the input. With this encoding of features, one can then proceed to compare separate inputs in a bid to measure their similarities. This may be used in the present invention to first build the work of pace baseline model of the agent, which is then used to compare current work pace data so to measure a degree of similarity or difference therebetween. As an example, in order to measure the degree of difference between the two vector representations (for example, the one generated to represent an agent's pace of work baseline model and the one generated to represent the agent's current pace of work) cosine similarity may be used. Cosine similarity is a metric that measures the likeness of two vectors by comparing the angles between them in a vector space. Other algorithms may also be used for this task.

The pace of work baseline model, or "model", is configured to be take all the parameters described above, the work pace parameters and context parameters. This model is blank at its creation. The model is trained with training data reflecting parameter data collected when the agent is not fatigued and/or performing at a high level. In certain embodiments, this means collecting the training data early in a shift when it is assumed the agent is fresh. This may be done for a particular interval defined within the shift. For example, if the interval is defined as an hour, then the training data may be collected during the first hour of the shift. In other embodiments, the training data is collected during the first part of the shift, but after a warmup period when the agent is still adjusting and getting acclimated to the workday. In such cases, the training data may be collected during the second hour of the workday. As described above, training data may also be gathered from particular intervals using a retrospective approach. In such cases, after a shift is complete, each interval occurring within the shift is evaluated or scored for performance in relation to the work pace parameters. From the score achieved in each interval, a representative interval may be identified that is judged to be most representative of non-fatigued output. In doing this, an interval having a score showing anomalous high performance may be identified and excluded from being used as the representative interval, as this would likely create unreal performance expectations. Such anomalies in performance may be calculated by determining whether the interval score statistical deviated from the norm beyond some predetermined threshold.

The training data that is used to train the pace of work baseline model may be gathered over multiple shifts so that the sample size is adequate. Further, the training data may continue to be gathered and used to update the model periodically. For example, in exemplary embodiments, the model is retrained periodically according to performance data gathered within a most recent window of time, which results in older data being excluded while new data is included into the training dataset. In this way, the pace of work baseline model stays current and reflects the current abilities and experience level of the agent, as both generally impact the pace at which agents are able to complete assignments.

During the training, the pace of work baseline model learns the patterns in the training data. The training process continues until the model's internal noise level achieves a predefined minimum. As will be appreciated, noise level is the inability of the model to understand the patterns in the data. From there, an automated fine-tuning process may be carried out, for example, by ignoring random parameters to check the noise level reduction. Once this is done, the model is ready to predict fatigue scores for real world data.

The trained pace of work baseline model, thus, is only aware of the non-fatigued performance of the agent, as this is the data that it is trained on. When the model receives work pace parameter data from a fatigued agent—for example, when the agent is tired or sleepy—the model can then be used to generate a deviation score that corresponds to a level of fatigued (which is assumed given the difference in performance of the agent). More specifically, the deviation score is a score that reflects the extent to which the current performance data (i.e., current pace of work data) deviates from the non-fatigued pace of work as represented in the pace of work baseline model. The fatigue score may be normalized within a range of 0 to 100% fatigued. Thus, when the deviation indicates that the current pace of work is essentially the same as the pace of work baseline, there will be essentially no deviation and the fatigue score will be 0%. That is, the agent will be found to be 0% fatigued. On the other end, when the deviation is found to be extreme (for example, a deviation beyond a certain threshold, the fatigue score will be 100%, i.e., the agent is 100% fatigued. Deviation scores between those extremes are mapped to the continuum.

In use, data for the several parameters, including the work pace parameters and context parameters, may be measured and monitored during sequentially occurring subperiods defined within a shift of an agent. For example, the subperiod may be 15 minutes, 30 minutes, etc. The collected data, which may be referred to a current pace of work data, then may be provided as an input to the pace of work of work baseline model, which is used to score a fatigue level of the agent in relation thereto. The model, being trained on non-fatigue performance data, then provides, as an output, the deviation of the current work pace parameters versus the training data used to create the model. The degree of deviation then becomes the basis for the fatigue score of the agent.

In exemplary embodiments, a pace of work baseline model may be constructed for individual agents or for a group of agents. For groups of agents, the groupings may be based on the agents currently in a particular queue, agents on a particular team, agents having a specific skill set, or as agents having some other common characteristic. The model is then trained on the combined work pace parameters, i.e., performance, of the group, as defined by the several parameters. For example, the model may learn the pace of work characteristics of the agents within the group based on non-fatigue output for a period of time covering multiple shifts, for example, over the most recent 1 to 4 weeks, and then the trained pace of work baseline model may be used to predict fatigue scores based on current pace of work data that is collected from the most recent subperiod with a shift. This may be repeated for each successive subperiod within the shift and tracked.

Figure 5:
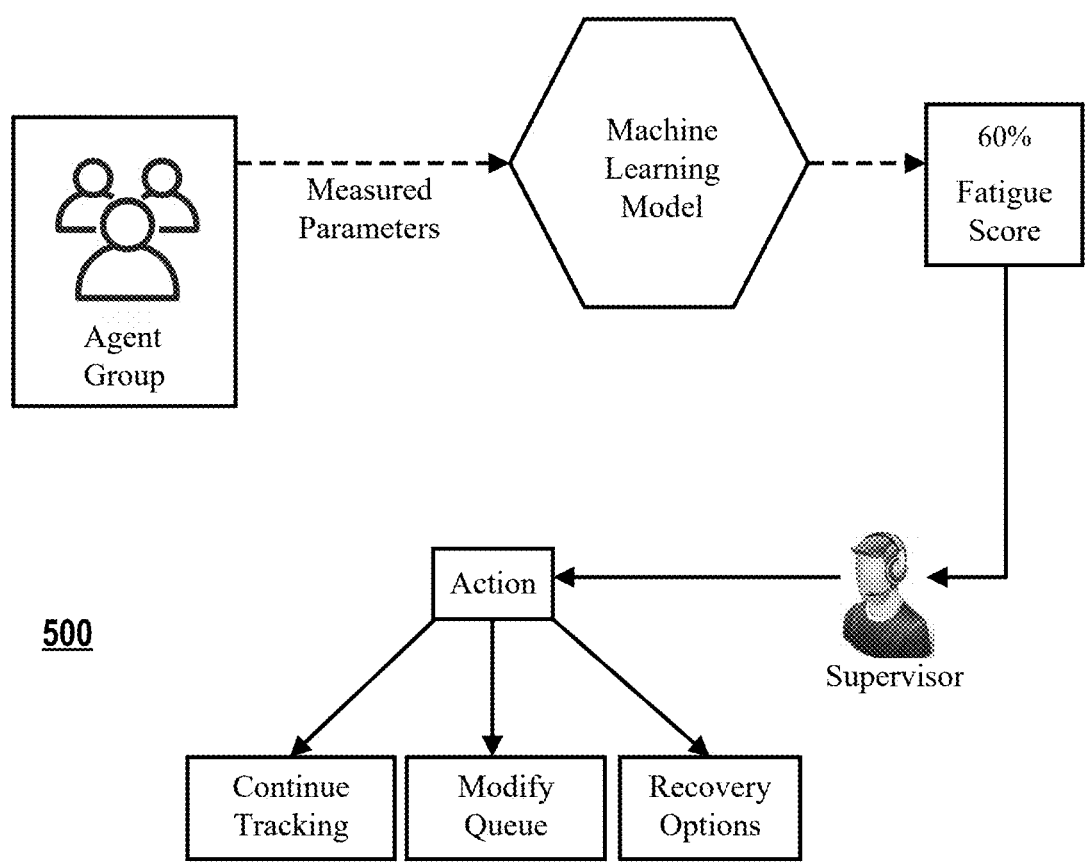
FIG. 5 is a schematic representation of a process flow in accordance with exemplary operation of the present invention.

With reference to FIG. 5, an exemplary flow of data is shown in accordance with an exemplary embodiment. As indicated, the process begins with parameters being measured periodically, e.g., 15 minutes, in relation to an agent or group of agents, as described above. The parameters may be provided as an input to a trained machine learning model. As will be appreciated, this data reflects a current pace of work, and the machine learning model is then used to generate a fatigue score in relation thereto. Specifically, the model, being trained on non-fatigue performance data, generates a output that includes an extent to which the current work pace, as reflected by the gathered parameters, deviates from the training data that was used to train the model. The degree of deviation then becomes the basis for the fatigue score of the agent. As discussed more below, the fatigue score may be communicated to a supervisor. The communication to the supervisor may include one or more recommended actions. Such actions, for example, may include further tracking, modifications to how the queue operates in relation to fatigued agents, or recovery options that help reenergize agents, each of which is discussed in detail below.

In this way, the pace of work baseline model can be used to continuously predict agent fatigue scores for each passing subperiod within a shift. As stated, this may be done for each agent and/or for the group as a whole. The predicted fatigue scores for the agents may be reported to a monitoring program that tracks the scores and provides other functionalities in association with detected fatigue levels. For example, in certain embodiments, the monitoring program may track changes in fatigue levels, such as rising fatigue levels. This may be done in relation to a percentage increase over fatigue scores in one or more of the preceding subperiods. The monitoring system may include fatigue threshold levels, which may be selected by a user. The fatigue threshold levels may allow the monitoring system to provide warnings to supervisors when thresholds are exceeded or implement a particular automated action in response. Fatigue threshold levels may be set in relation to a maximum fatigue score that is allowed before the threshold is passed and may apply to an average score or a group and/or a score for an individual. Fatigue threshold levels may be set in relation to how fast fatigue levels are rising, for example, defining a maximum number of successive subperiods where fatigue levels rose by more than a minimum amount that are allowed before the threshold is passed. Such a threshold may only become active when an agent or group of agents has a fatigue score that is at least higher than some minimum level, for example, at least 20% or 40%. Thresholds may also be set as warnings, i.e., to warn when an agent or group of agents is approaching a high fatigue score that would indicate fatigue setting in.

Once thresholds are exceeded, the monitoring system may classify the agent/group of agents as being fatigued or nearing fatigue, as required by the particular threshold. This classification may be communicated to a supervisor with one or more recommended actions to take. Such actions may include providing breaks to particular agents or groups of agents, modifying how routing routines distribute incoming interactions, reassign agents to other types of work (for example, work not involving live customers), providing an activity break (such as stretching or other types of active movement), and/or reducing workload. In certain embodiments, these actions may be taken automatically, with the monitoring system communicating directly with the affected agents to provide then necessary instructions. In other cases, the monitoring system may send automated instructions to routing programs and other applications that assign work that automatically implement the necessary modifications. In other embodiments, scheduling changes may be recommended. For example, if an agent is exhausted in a current shift and is working a double shift, a recommendation may include giving that agent the next shift off and filling that slot with another agent who is available to cover that shift. The efficacy of the actions may also be tracked by the monitoring system, i.e., the system may track how any actions taken affected fatigue levels during subsequent subperiods. The recommendation system may then provide reports to supervisors regarding which actions had the greatest positive effect and/or tend to recommend the better performing actions more often. Upon approval by a supervisor, the action may be automatically implemented.

The ability to address fatigue issues before they impact contact center performance is a difference making tool for supervisors. Tired agents that are given a needed break to regain their focus may not only perform better, but such agents are likely to be appreciative toward what they perceive as an empathic employer. Agents often represent the people on the frontlines for businesses, making it very important for them to present a positive, energetic face to every customer interaction. Indeed this has been shown to often represent a key component in gaining a customer's appreciation and satisfaction during an interaction. That is, agents who are energetic and positive during interactions are much more likely to be rated highly by customers in terms of providing a satisfying experience. Even when an agent provides an effective solution that resolves a customer issue, when the agent does it with a tired/flat voice and short responses, customers generally do not rate the overall experience as being positive. This is not a tolerable result for businesses that depend on a reputation for being customer-friendly. The present invention offers a proactive way for contact centers to confront fatigue issues that are common in the customer service industry. Its implementation has shown to improve overall productivity among agents as well as customer satisfaction scores.

Figure 6:
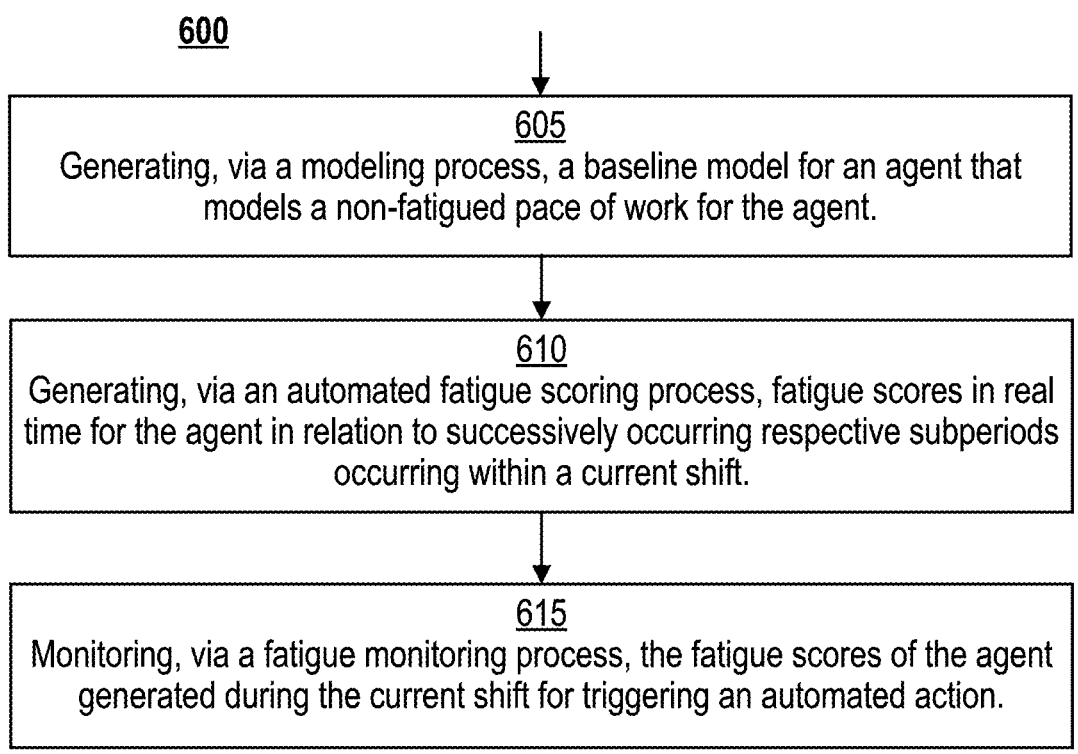
FIG. 6 is a method of exemplary operation of the present invention in accordance with an embodiment.

With reference now to FIG. 6, an exemplary method 600 is shown that illustrates an embodiment of the present invention. The method 600 begins, at step 605, by generating, via an automated modeling process, a baseline model for an agent that models a non-fatigued pace of work for the agent. At step 610, the method 600 continues by generating, via an automated fatigue scoring process, fatigue scores in real time for the agent in relation to successively occurring respective subperiods occurring within a current shift. At step 615, the method 600 continues by monitoring, via a fatigue monitoring process, the fatigue scores of the agent generated during the current shift for triggering an automated action. Each of the process referenced in the steps above will now be discussed in turn.

In accordance with exemplary embodiments, the automated modeling process of step 605 may include the steps of: identifying intervals within respective shifts of the agent for representing non-fatigued pace of work data for the agent; measuring, during each of the identified intervals via a monitoring script operating on a workstation of the agent, values associated with a plurality of work pace parameters; creating a training dataset that includes the measured values for the plurality of work pace parameters for each of the intervals; using the training dataset to train the baseline model for the agent via a machine learning algorithm, wherein the pace of work baseline model includes a neural network that is trained to: model the non-fatigued pace of work for the agent; and output a degree of deviation between the non-fatigued pace of work for the agent and an input of a current dataset representing a current pace of work.

In accordance with exemplary embodiments, the automated fatigue scoring process of step 610, when described in relation to fatigue scoring for a first subperiod of the successive subperiods, may include the steps of: measuring, during the first subperiod via the monitoring script, values associated with a plurality of work pace parameters; creating a current dataset that includes the measured values for the plurality of work pace parameters for the first subperiod; providing, as input to the baseline model, the current dataset and generating as an output a degree of deviation between the non-fatigued pace of work of the baseline model and a current pace of work represented in the current dataset; and generating a fatigue score for the agent for the first subperiod based on the degree of deviation.

In accordance with exemplary embodiments, the automated fatigue scoring process of step 615 may include the steps of: comparing one or more of the fatigue scores of the current shift to one or more fatigue thresholds; and based on whether the one or more fatigue scores exceed the one or more fatigue thresholds, selectively triggering an automated action.

In certain embodiments, the work pace parameters may include a plurality of the following: a typing parameter that includes at least one of chat typing parameter measuring a speed and accuracy of a typing of the agent when engaged in a chat session with a customer, and an email typing parameter measuring a speed and accuracy of a typing of the agent when emailing a customer; a mouse movement parameter measuring a rate at which the agent moves a mouse as the agent executes a predetermined type of movement for completing a certain task; a voice parameter measuring at least volume and lengths of pauses while the agent speaks to a customer; a response time parameter measuring a length of time for the agent to complete a response to a pending chat or email assignment once the assignment becomes a next pending assignment in a queue of the agent; a response length parameter measuring a length in number of words of content generated in responses completed by the agent to a chat or email assignment; and a breaks taken parameter measuring a number, length, and type of breaks taken by the agent.

In certain embodiments, the automated modeling process further includes the steps of: measuring, in association with each of the measured values for the plurality of work pace parameters, values associated with a plurality of context parameters; and creating the training dataset to include the measured values for the plurality of work pace parameters and the plurality of context parameters associated therewith for each of the intervals. In such cases, the automated fatigue scoring process, when described in relation to the first subperiod of the subperiods, may include the steps of: measuring, in association with each of the measured values for the plurality of work pace parameters in the first subperiod, values associated with a plurality of context parameters; creating the current dataset to includes the measured values for the plurality of work pace parameters and the plurality of context parameters associated therewith for the first subperiod. In certain embodiments, the plurality of context parameters may include: a time-of-day parameter recording and tracking a time of day for associating with measurements taken in relation to the work pace parameters; a shift type parameter identifying attributes related to a shift the agent is working, including whether the shift is a morning shift, afternoon shift, or night shift, length of the shift, and a proximity other shifts the agent has worked; and a last break parameter recording and tracking an accumulated time since the agent last had a break for associating with measurements taken in relation to the work pace parameters.

In certain embodiments, the automated monitoring process includes selectively triggering an action when at least one of the fatigue scores is determined to exceed a fatigue threshold. In such case, the automated action may include generating and transmitting an electronic communication to a predetermined user device associated with a supervisor of the agent. The electronic communication may include information explaining the extent to which the fatigue score of the agent exceeded the fatigue thresholds. The electronic communication may include at least one recommendation of a preventative action designed to limit a negative impact to a performance of the agent due to fatigue associated with the fatigue score. The preventative action may include at least one of: transmitting an instruction to a routing program that changes a rate at which interactions are routed to the agent; transmitting an instruction to a routing program that changes a type of interaction that is routed to the agent; transmitting an instruction to a routing program that limits the agent to handling only customer interactions not involving realtime communication; and transmitting a communication to the agent that grants the agent extra break time during the current shift. In some embodiments, the electronic communication may include a request for the supervisor to approve the preventative action for automated implementation. The automated monitoring process further may include the step of implementing the preventative action in response to receiving a reply electronic communication from the predetermined user device of the supervisor granting the requested approval.

In certain embodiments, the step of identifying the intervals within respective shifts of the agent (i.e., for representing non-fatigued pace of work data for the agent) includes identifying an interval of time occurring during each of the shifts that begins at a same time in relation to a start of the shift and ends before the shift has reach a midpoint. In such cases, the beginning of the interval may coincide with the start of the shift (or it may start after a warmup period expires). In certain embodiments, the length of the interval is a period of time of between 45 minutes and 2 hours.

In other embodiments, the step of identifying the intervals within respective shifts of the agent (i.e., for representing non-fatigued pace of work data for the agent) include a retrospective process. The retrospective process may include scoring a plurality of non-overlapping intervals occurring within each of the respective shifts in regard to the agent performance relative to the work pace parameters. With this complete, one of the intervals then may be selected from the scores. For example, one of the plurality of non-overlapping intervals may be selected based on the selected one having a score that is better than at least one other plurality of non-overlapping intervals.

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. Further, it should be apparent that the foregoing relates only to the described embodiments of the present application and that numerous changes and modifications may be made herein without departing from the spirit and scope of the present application as defined by the following claims and the equivalents thereof.

That which is claimed:

1. A computer-implemented method for tracking a level of fatigue among contact center agents for automatically generating corrective actions, the method comprising:
   generating, via an automated modeling process, a baseline model for an agent that models a non-fatigued pace of work for the agent, wherein the baseline model comprises an autoencoder machine learning model applied for representation learning to construct the baseline model by:
      identifying intervals within respective shifts of the agent for representing non-fatigued pace of work data for the agent;
      measuring, during each of the intervals via a monitoring script operating on a workstation of the agent, values associated with a plurality of work pace parameters, wherein the plurality of work pace parameters comprise:
         a typing parameter that includes at one of: chat typing parameter measuring a speed and accuracy of a typing of the agent when engaged in a chat session; and an email typing parameter measuring a speed and accuracy of a typing of the agent when emailing;
         a mouse movement parameter measuring a rate at which the agent moves a mouse as the agent executes a predetermined type of movement for completing a certain task;
         a voice parameter measuring at least volume and lengths of pauses while the agent speaks to a customer;
         a response time parameter measuring a length of time for the agent to complete a response to a pending chat or email assignment once the pending chat or email assignment becomes a next pending assignment in a queue of the agent;
         a response length parameter measuring a length in number of words of content generated in responses completed by the agent to a chat or email assignment; and
         a breaks taken parameter measuring a number, length, and type of breaks taken by the agent;
      creating a training dataset that includes the values for the plurality of work pace parameters for each of the intervals;
      using the training dataset to train the baseline model for the agent via a machine learning algorithm, wherein the baseline model comprises a neural network that is trained to:
         model the non-fatigued pace of work for the agent; and
         output a degree of deviation between the non-fatigued pace of work for the agent and an input of a current dataset representing a current pace of work;
   generating, via an automated fatigue scoring process, fatigue scores in real time for the agent in relation to successively occurring respective subperiods occurring within a current shift of the agent, wherein, when described in relation to a first subperiod of the subperiods, the automated fatigue scoring process comprises the steps of:
      measuring, during the first subperiod via the monitoring script, values associated with the plurality of work pace parameters for the first subperiod;
      creating a current dataset that includes the values associated with the plurality of work pace parameters for the first subperiod;
      providing, as input to the baseline model, the current dataset and generating as an output a degree of deviation between the non-fatigued pace of work of the baseline model and a current pace of work represented in the current dataset;
      generating a fatigue score for the agent for the first subperiod based on the degree of deviation;
   monitoring, via a fatigue monitoring process, fatigue scores of the agent generated during the current shift, wherein the fatigue monitoring process comprises the steps of:
      comparing one or more of the fatigue scores of the current shift to one or more fatigue thresholds; and based on whether the one or more fatigue scores exceed the one or more fatigue thresholds, generating and transmitting an electronic communication to a predetermined user device associated with a supervisor of the agent.

2. The computer-implemented method of claim 1, wherein:
the automated modeling process further comprises the steps of:
measuring, in association with each of the values for the plurality of work pace parameters, values associated with a plurality of context parameters; and
creating the training dataset to include the values for the plurality of work pace parameters and the values associated with the plurality of context parameters for each of the intervals.

3. The computer-implemented method of claim 2, wherein:
when described in relation to the first subperiod of the subperiods, the automated fatigue scoring process further comprises the steps of:
measuring, in association with each of the values for the plurality of work pace parameters in the first subperiod, values associated with the plurality of context parameters for the first subperiod;
creating the current dataset to include the values for the plurality of work pace parameters for the first subperiod and the plurality of context parameters for the first subperiod.

4. The computer-implemented method of claim 3, wherein the plurality of context parameters includes at least two of the following three context parameters:
a time-of-day parameter recording and tracking a time of day for associating with measurements taken in relation to the plurality of work pace parameters;
a shift type parameter identifying attributes related to a shift the agent is working, including whether the shift is a morning shift, afternoon shift, or night shift, length of the shift, and a proximity other shifts the agent has worked; and
a last break parameter recording and tracking an accumulated time since the agent last had a break for associating with measurements taken in relation to the plurality of work pace parameters.

5. The computer-implemented method of claim 3, wherein the plurality of context parameters includes all three of the following context parameters:
a time-of-day parameter recording and tracking a time of day for associating with measurements taken in relation to the plurality of work pace parameters;
a shift type parameter identifying attributes related to a shift the agent is working, including whether the shift is a morning shift, afternoon shift, or night shift, length of the shift, and a proximity other shifts the agent has worked; and
a last break parameter recording and tracking an accumulated time since the agent last had a break for associating with measurements taken in relation to the plurality of work pace parameters.

6. The computer-implemented method of claim 1, wherein the automated monitoring process comprises selectively triggering the automated action when at least one of the one or more fatigue scores is determined to exceed at least one of the one or more fatigue thresholds.

7. The computer-implemented method of claim 1, wherein the electronic communication includes a request for the supervisor to approve the preventative action for implementation; and
wherein the automated monitoring process further comprises the step of implementing the preventative action in response to receiving a reply electronic communication from the predetermined user device granting the requested approval.

8. The computer-implemented method of claim 1, wherein the step of identifying the intervals within the respective shifts of the agent for representing non-fatigued pace of work data for the agent comprises:
identifying an interval of time occurring during each of the shifts that begins at a same time in relation to a start of the respective shift and ends before the respective shift has reach a midpoint.

9. The computer-implemented method of claim 8, wherein a beginning of an interval coincides with the start of the respective shift; and
wherein a length of the interval is a period of time of between 45 minutes and 2 hours.

10. The computer-implemented method of claim 1, wherein the step of identifying the intervals within the respective shifts of the agent for representing non-fatigued pace of work data for the agent comprises:
scoring a plurality of non-overlapping ones of the intervals occurring within each of the respective shifts in regard to agent performance relative to the plurality of work pace parameters; and
selecting one of the plurality of non-overlapping ones of the intervals based on the scoring indicating that a score of the selected one of the plurality of non-overlapping ones of the intervals is better than a score of at least one other of the plurality of non-overlapping ones of the intervals.

11. The computer-implemented method of claim 1, wherein the electronic communication comprising information explaining an extent to which at least one of the one or more fatigue scores of the agent exceeded at least one of the one or more fatigue thresholds.

12. The computer-implemented method of claim 11, wherein the electronic communication includes at least one recommendation of a preventative action designed to limit a negative impact to a performance of the agent due to fatigue associated with the at least one of the one or more fatigue scores.

13. The computer-implemented method of claim 12, wherein the preventative action comprises at least one of:
transmitting an instruction to a routing program that changes a rate at which interactions are routed to the agent;
transmitting an instruction to the routing program that changes a type of interaction that is routed to the agent;
transmitting an instruction to the routing program that limits the agent to handling only customer interactions not involving realtime communication; and
transmitting a communication to the agent that grants the agent extra break time during the current shift.

14. A system for tracking a level of fatigue among contact center agents for automatically generating corrective actions, the system comprising:
a processor; and
a memory storing instructions which, when executed by the processor, cause the processor to perform the steps of:

generating, via an automated modeling process, a baseline model for an agent that models a non-fatigued pace of work for the agent, wherein the baseline model comprises an autoencoder machine learning model applied for representation learning to construct the baseline model by:
  identifying intervals within respective shifts of the agent for representing non-fatigued pace of work data for the agent;
  measuring, during each of the intervals via a monitoring script operating on a workstation of the agent, values associated with a plurality of work pace parameters, wherein the plurality of work pace parameters comprise:
    a typing parameter that includes at one of: chat typing parameter measuring a speed and accuracy of a typing of the agent when engaged in a chat session; and an email typing parameter measuring a speed and accuracy of a typing of the agent when emailing;
    a mouse movement parameter measuring a rate at which the agent moves a mouse as the agent executes a predetermined type of movement for completing a certain task;
    a voice parameter measuring at least volume and lengths of pauses while the agent speaks to a customer;
    a response time parameter measuring a length of time for the agent to complete a response to a pending chat or email assignment once the pending chat or email assignment becomes a next pending assignment in a queue of the agent;
    a response length parameter measuring a length in number of words of content generated in responses completed by the agent to a chat or email assignment; and
    a breaks taken parameter measuring a number, length, and type of breaks taken by the agent;
  creating a training dataset that includes the values for the plurality of work pace parameters for each of the intervals;
  using the training dataset to train the baseline model for the agent via a machine learning algorithm, wherein the baseline model comprises a neural network that is trained to:
    model the non-fatigued pace of work for the agent; and
    output a degree of deviation between the non-fatigued pace of work for the agent and an input of a current dataset representing a current pace of work;
generating, via an automated fatigue scoring process, fatigue scores in real time for the agent in relation to successively occurring respective subperiods occurring within a current shift of the agent, wherein, when described in relation to a first subperiod of the subperiods, the automated fatigue scoring process comprises the steps of:
  measuring, during the first subperiod via the monitoring script, values associated with the plurality of work pace parameters for the first subperiod;
  creating a current dataset that includes the values associated with the plurality of work pace parameters for the first subperiod;
  providing, as input to the baseline model, the current dataset and generating as an output a degree of deviation between the non-fatigued pace of work of the baseline model and a current pace of work represented in the current dataset;
  generating a fatigue score for the agent for the first subperiod based on the degree of deviation;
monitoring, via a fatigue monitoring process, fatigue scores of the agent generated during the current shift, wherein the fatigue monitoring process comprises the steps of:
  comparing one or more of the fatigue scores of the current shift to one or more fatigue thresholds;
  based on whether the one or more fatigue scores exceed the one or more fatigue thresholds, generating and transmitting an electronic communication to a predetermined user device associated with a supervisor of the agent.

\* \* \* \* \*